(12) United States Patent
Krishna (10) Patent No.: US 7,972,205 B2
(45) Date of Patent: Jul. 5, 2011

(54) SEARCH ENGINE CROSSWORD PUZZLE

(76) Inventor: Vijay Krishna, New Albany, IN (US)

( * ) Notice: Subject to any disclaimer, the term of this patent is extended or adjusted under 35 U.S.C. 154(b) by 642 days.

(21) Appl. No.: 11/731,063

(22) Filed: Mar. 30, 2007

(65) Prior Publication Data

US 2007/0232376 A1 Oct. 4, 2007

Related U.S. Application Data

(60) Provisional application No. 60/788,149, filed on Mar. 31, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. ......... 463/9; 273/153 R; 273/429; 273/430; 273/272; 273/273; 273/431

(58) Field of Classification Search ................. 463/9, 23, 463/40, 42
See application file for complete search history.

(56) References Cited

U.S. PATENT DOCUMENTS

| | | | | |
|---|---|---|---|---|
| 4,369,973 A * | 1/1983 | D'Aurora et al. | ................. | 463/9 |
| 5,479,506 A * | 12/1995 | Rehm | ............................... | 380/1 |
| 5,566,942 A * | 10/1996 | Elum | ...................... | 273/153 R |
| 5,667,438 A * | 9/1997 | Rehm | ............................... | 463/9 |
| 5,921,864 A * | 7/1999 | Walker et al. | ..................... | 463/9 |
| 6,378,867 B1 * | 4/2002 | Shalless | ........................ | 273/240 |
| 6,585,585 B1 * | 7/2003 | Fletcher | ............................ | 463/9 |
| 6,645,071 B2 * | 11/2003 | Perrie et al. | ..................... | 463/16 |
| 6,659,862 B2 * | 12/2003 | Wong | ............................... | 463/10 |
| 6,676,521 B1 * | 1/2004 | La Mura et al. | ................ | 463/42 |
| 6,750,978 B1 * | 6/2004 | Marggraff et al. | ........... | 358/1.12 |
| 6,790,138 B1 * | 9/2004 | Erlichman | ........................ | 463/9 |
| 6,964,608 B1 * | 11/2005 | Koza | ................................. | 463/9 |
| 7,557,939 B2 * | 7/2009 | Marggraff et al. | ........... | 358/1.12 |
| 7,577,978 B1 * | 8/2009 | Wistendahl et al. | ........... | 725/113 |
| 2001/0032133 A1 * | 10/2001 | Moran | ............................ | 705/14 |
| 2001/0042002 A1 * | 11/2001 | Koopersmith | .................. | 705/10 |
| 2001/0049297 A1 * | 12/2001 | Hibscher et al. | .................. | 463/9 |
| 2001/0053513 A1 * | 12/2001 | Corn et al. | ..................... | 434/350 |
| 2002/0077166 A1 * | 6/2002 | Ferguson | .......................... | 463/9 |
| 2002/0107062 A1 * | 8/2002 | Wong | ................................ | 463/9 |
| 2002/0117802 A1 * | 8/2002 | Seaberg | .................... | 273/153 R |
| 2003/0060250 A1 * | 3/2003 | Chan | ................................ | 463/9 |
| 2003/0139210 A1 * | 7/2003 | Raben | ............................... | 463/9 |
| 2003/0232635 A1 * | 12/2003 | Yanagishita | ...................... | 463/9 |
| 2004/0162126 A1 * | 8/2004 | Rehm et al. | ...................... | 463/9 |
| 2004/0171413 A1 * | 9/2004 | Charpentier | ...................... | 463/9 |
| 2004/0195765 A1 * | 10/2004 | Bellefleur | ................. | 273/153 R |

(Continued)

OTHER PUBLICATIONS

Parker, Tim. "Universal Crossword: Flash Edition" Feb. 10, 2001— Webpage retrieved from the Internet Archive: Wayback Machine <http://web.archive.org/web/20010210012759/http://content.uclick.com/content/cx.html>.*

(Continued)

*Primary Examiner* — Paul A. D'Agostino

(57) ABSTRACT

A grid game, such as crossword, operable on a networked computer or internet enabled device, which employs pre-designed clues and searching and search engine retrieval functions to aid the user in ascertaining the answers. The results generated by the search engine are displayed in pre-determined locations on the results page returned by the search engine.

17 Claims, 7 Drawing Sheets

Search-It-Now

U.S. PATENT DOCUMENTS

| | | | | |
|---|---|---|---|---|
| 2004/0209231 | A1* | 10/2004 | Merritt | 434/156 |
| 2004/0249801 | A1* | 12/2004 | Kapur | 707/3 |
| 2004/0267737 | A1* | 12/2004 | Takazawa et al. | 707/3 |
| 2006/0281512 | A1* | 12/2006 | Rehm | 463/9 |
| 2007/0064264 | A1* | 3/2007 | Silverbrook et al. | 358/1.15 |
| 2007/0182097 | A1* | 8/2007 | Dowe | 273/272 |

OTHER PUBLICATIONS

"One Across" Nov. 1, 1999 <http://www.oneacross.com/main/pressrelease.html> and <http://www.oneacross.com/main/about.html>.*

* cited by examiner

\* Users may select a different clue to solve at any given point.

Search-It-Now (a)=cursor on clue "vehicle" (1 across), prompting user with options of "hint," "solve," "search"

(b) (also signified with an arrow )=clue vehicle appearing in search box on performing (a), i.e., moving cursor on to clue "vehicle"

1 (a)=completed answers (hyperlinked) for clues 1 across and 1 down
3 (a)=completed answer (hyperlinked) for clue 3 across
2 (b)=completed answers (hyperlinked) for clue 2 down

*Congratulations! You did it! Click on clue or word to see how your answers are displayed on search results pages*

Search-It-Now

Advertise With Us – Submit Your Site –
About Make Search-it-now Your Homepage!
©2007 Search-it-now

SEARCH ENGINE CROSSWORD PUZZLE

CROSS-REFERENCE TO RELATED APPLICATION

This application claims priority to U.S. provisional application 60/788,149, filed Mar. 31, 2006.

BACKGROUND OF THE INVENTION

Crossword puzzles are well known and have been used for public consumption in various media. They have been used to entertain and educate the masses of all age groups for millions of people in the world. A crossword puzzle game is constructed as a plurality of squares resembling a grid. The squares are arranged in rows and columns. Each square can take one letter of an answer to a clue. Certain squares in on the grid are numbered. The numbered squares indicate the starting point of an answer in a column or row to a clue corresponding to a row or column. The number of letters in an answer (sometimes indicated next to the clues) must exactly fit the given squares of rows or columns. Often the letters of clues in each column intersect with the letters of clues in each row. As a variation some grids may have answers in rows and columns that are mutually exclusive. Conversely, the letters in rows and columns do not intersect.

Crossword puzzles were the primary domain of the print medium (newspapers, magazines) until the advent of the new media, particularly the Internet. Crossword is growing as a popular online pastime for millions of Internet users in the world. An incentive for playing online is the availability of instantaneous results. The users can either get the results in a static format, in which the user completes the puzzle and verifies the answers (static format) or in a dynamic format in which the user is instantly notified of the right or wrong letter in real time. If the user begins to type the letters of an answer in the square, the color of the correct letter may be indicated in a certain color (say black) and the color of an incorrect letter may be indicated in another color (say red). This way a user knows if they are typing a correct answer in a row or column they choose to answer. The puzzle solver may choose the dynamic format which guides them in completing the puzzle with correct clues. The other option for a puzzle solver to generate answers to clues, whether playing static or dynamic online crossword puzzle, is to rely on plurality of sources including personal knowledge, online or hard copy dictionary, etc. This method of relying on a plurality of sources is a conventional format. Practically all crossword puzzle designers expect the puzzle solvers to rely on this method to generate answers for the clues.

Some online and offline crossword puzzles rely on the puzzle solvers to generate answers in a conventional format. Here though, the present invention uses a unique method to design and generate clues and answers for an online or offline crossword puzzle. This invention uses an online search engine to generate clues and answers in a unique method. The method expects the crossword designers and puzzle solvers to use a search engine to generate and play the puzzle. Search Engine Crossword puzzles are designed with various degrees of difficulty for all age groups of puzzle solvers.

SUMMARY OF THE INVENTION

The present invention embodies an online crossword puzzle, a grid having squares numbered to indicate a starting point of an answer set. The interconnected squares forming the grid are each designed to contain one insertable letter, which in a set form a solution to a predesigned clue for that row of squares. Each time a puzzle solver moves the cursor on to a numbered square or cell, a clue corresponding to that column or row will appear in a strategic (user-friendly) location, on the puzzle solvers screen near the puzzle. Simultaneously, the clue appears in the search engine box, also conspicuously located on the puzzle solver's screen near the puzzle. This allows puzzle solver, in case they do not know the answer to a clue, to instantly search for an answer among search results retrieved using a search engine by simply clicking on the "search" button.

The next step in the present invention relates to the method of looking for answers on the pages of results generated by a search engine. This invention guides a puzzle solver to look for an answer in a plurality of locations on a results page of a search engine. The degree of difficulty for the puzzle solver is pre-determined by the crossword puzzle designer at two levels: first, the complexity of the clue and second, the physical location of the answer, plurality of answers on the results page of a search engine, or answers highlighted in some manner. This method of playing the crossword online may also be employed for crossword puzzles published in a newspaper or any print medium. However, if a puzzle solver does not know the answer to a clue or clues and would like the facility to search online, they will need access to the online version of the game. A URL may direct the puzzle solvers of offline Search Engine Crossword to the online version.

The results returned by a search engine for a Search Engine Crossword clue may not necessarily be the exact same results returned by a search engine for that word when searched as a non-Search Engine Crossword clue. For example, the results for a search engine clue "sweet" returned by the search engine may or may not be the same as when searching for "sweet" as a non-Search Engine Crossword Clue.

DESCRIPTION OF THE DRAWINGS

The structure of the game of crossword puzzle according to the invention is described with reference to the accompanying Figures, which are.

DETAILED DESCRIPTION OF EMBODIMENTS

The following four sections describe the Search Engine Crossword invention in detail:

I. Method of Playing the Puzzle
II. Method of Generating Text Clues and Answers
III. Method of Generating Image Clues and Answers
IV. Method of Generating Solution by the User.

Method of Playing of the Puzzle.

Figure 4:
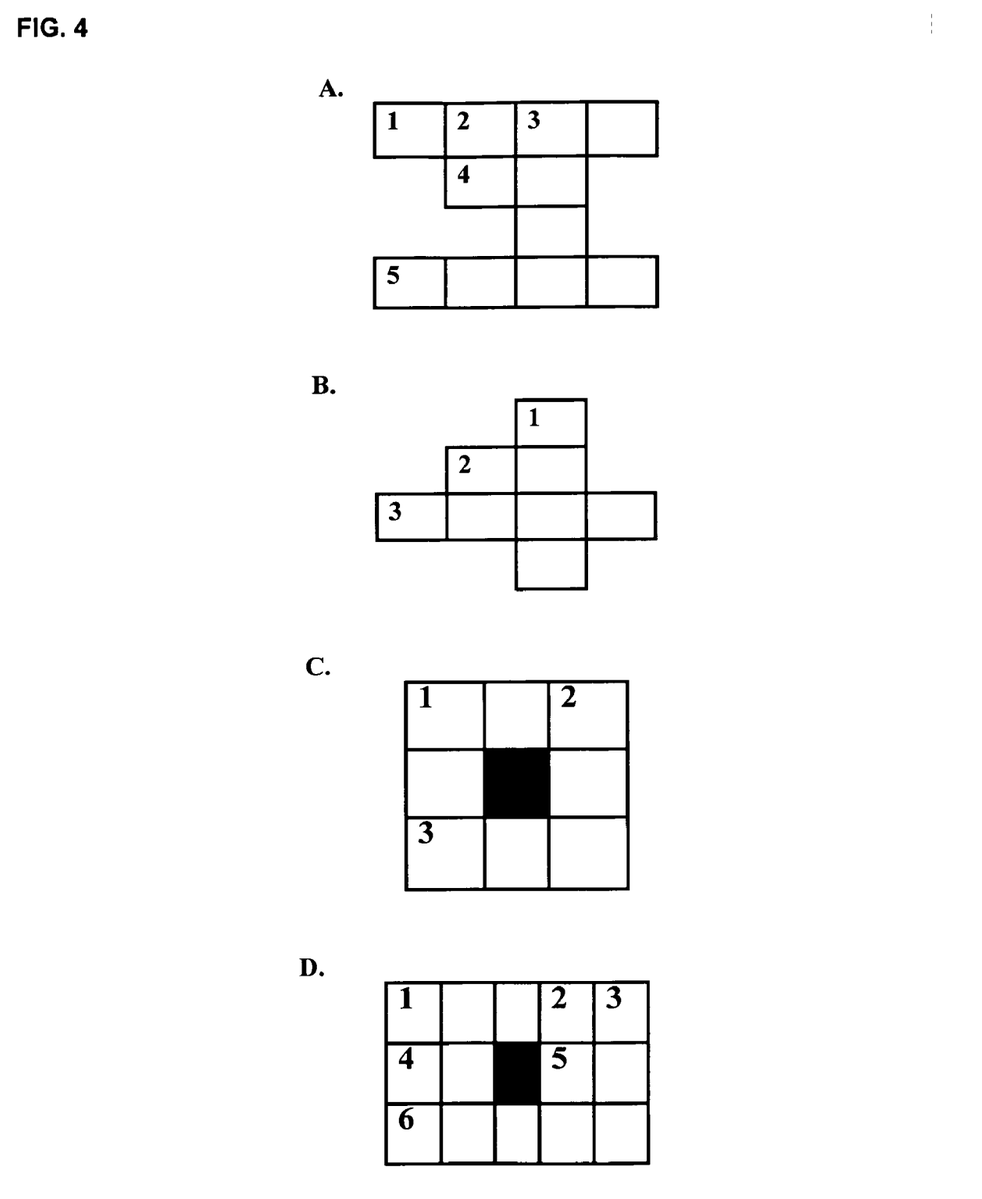
FIG. 4 is a display of a sample Search Engine Crossword grid. This drawing shows how a Search Engine Crossword grid is laid out, including in A that (a) corresponding numbers indicate rows, (b) corresponding numbers indicate columns, in B the (a) Columns, (b) Rows, in C the (a) Columns, (b) Rows, and in D the (a) Columns, (b) Rows.
Figure 5:
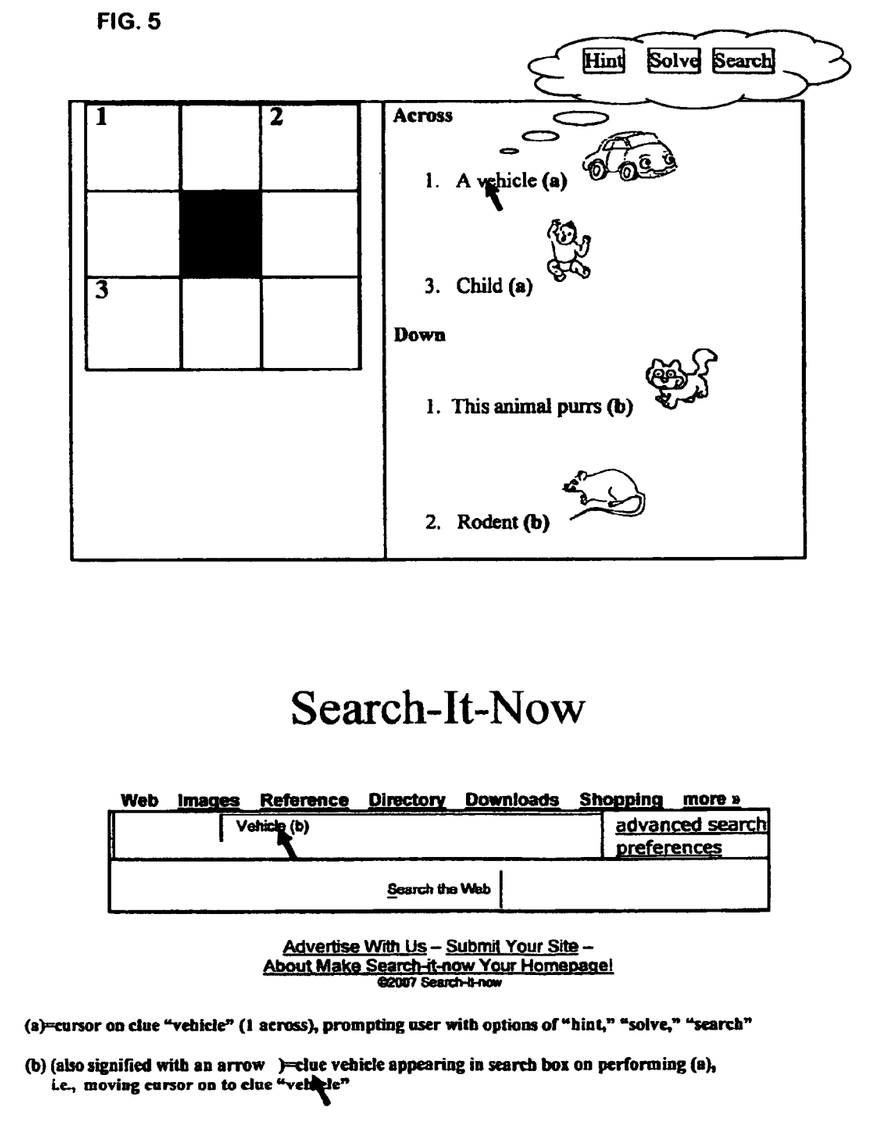
FIG. 5 is a display of Search Engine Crossword grid when the puzzle solver moves the cursor on to a clue, including in that (a) cursor on clue "vehicle" (1 across), prompting user with options of "hint," "solve," "search" and that (b) (also signified with an arrow) clue vehicle appearing in search box on performing (a), i.e., moving cursor on to clue "vehicle."
Figure 6:
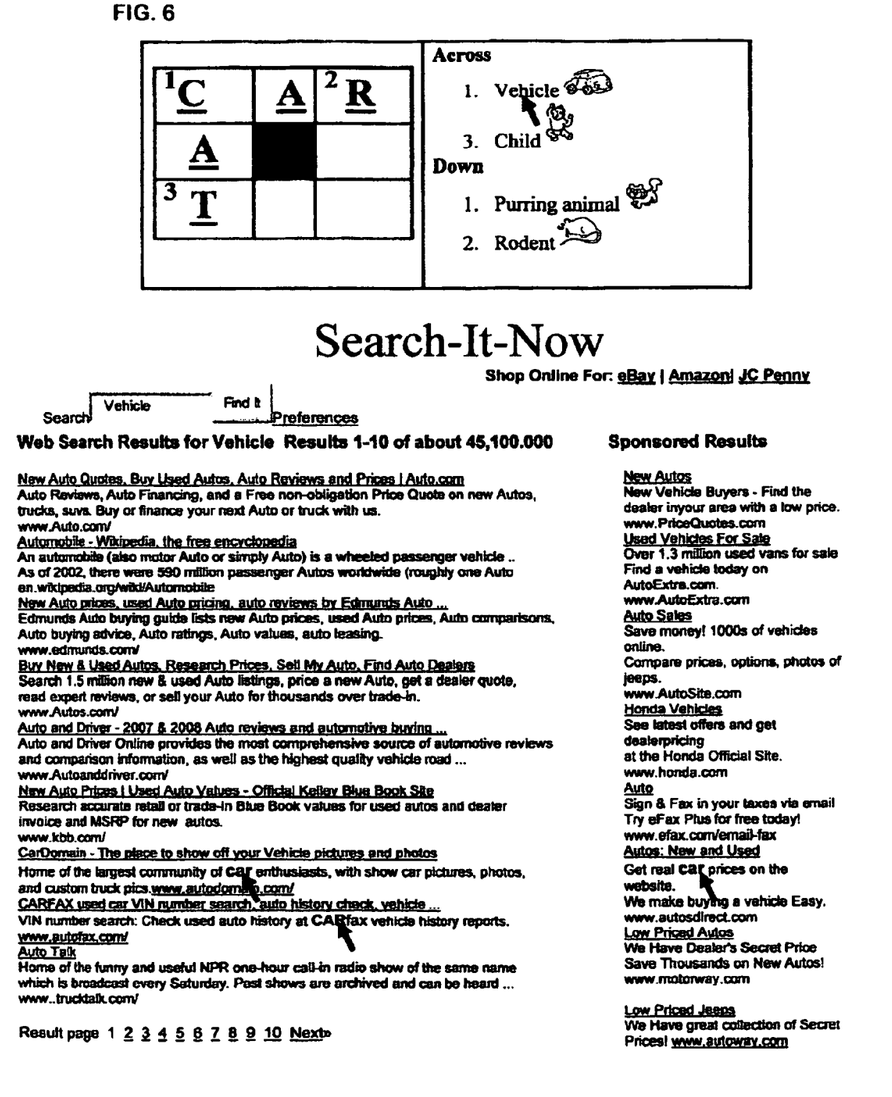
FIG. 6 is a display of results generated by a search engine for a particular clue, including that (a) Search results for the clue "vehicle" Answer (car) for the clue "vehicle."

A Search Engine Crossword Puzzle may be dimensioned with varied grid and squares arrangements, such as arrayed horizontally and vertically in rows. In the online embodiment, operable on a computer-enabled network such as the internet, the user is presented a graphical grid interface, as in FIG. 4, mapped on the screen of a computer, having a cursor. In the typical embodiment, the numbered squares correspond to "ACROSS" or "DOWN" clues that can be displayed near the puzzle, as in FIG. 6. Once the user decides to play the Search Engine Crossword, the user navigates to a numbered square on the grid, using the cursor. That intersection causes a pre-designed clue, corresponding to the cells or squares in the row that begins with the numbered square, to be displayed, as in FIG. 5. The clues are pre-designed to be suggestive of letters and character sets to be inserted in the corresponding cells and row, using a text input device such as a computer keyboard, or even an internet-enabled cell phone. The user continues selecting square and being directed to displayed clues, as they move the cursor to the numbered squares. If the puzzle solvers know the answer, they use the text input device to type in the set of characters that are the answer to that row and clue. If the user does not know the answer that corresponds to the clue, then they can move the cursor on to the clue and obtain a plurality of options such as: a) Obtain a hint or b) Switch clue or c) Move to a new clue or d) Perform search for the clue by clicking on the search option or e) Solve the word or the entire puzzle by clicking the respective options.

Figure 2:
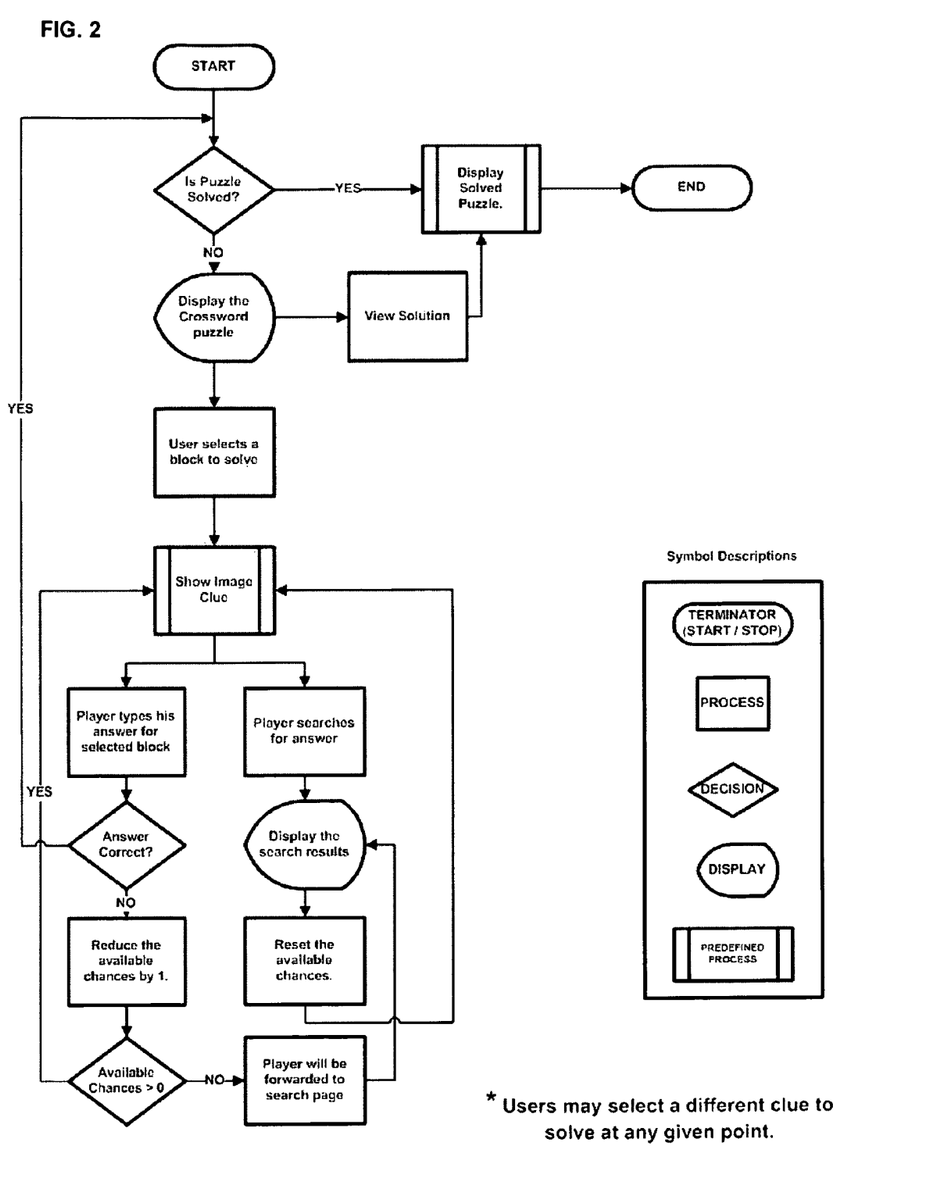
FIG. 2 is a Flowchart with limited attempts option.
Figure 3:
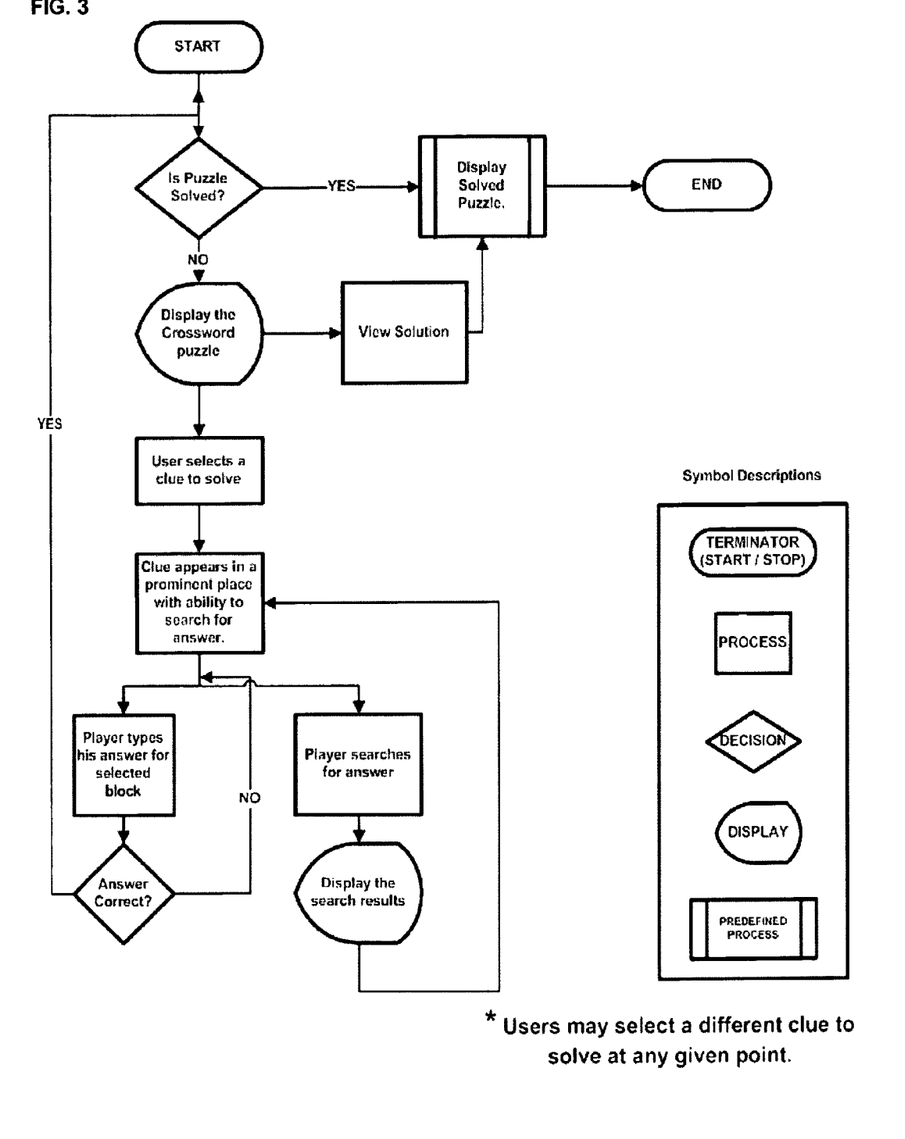
FIG. 3 is a Flowchart with unlimited attempts option.

The puzzle solver will start inserting the answers into the cells forming the grid by typing the letters on the keyboard. An answer, when correct, becomes indicated typically by a change in color on the graphical interface (e.g.: black), and a wrong answer is indicated in another color (e.g.: red). A variation is that as a puzzle solver types letters to make the answer, a correct letter that will form a correct answer will appear in a different font type. A puzzle solver will get limited chances (such as two or three) to enter correct answer in the crossword squares. Once the puzzle solvers exhaust their attempts to fill the correct answers, the search engine will, by default, perform search for that particular due and generate answers. The puzzle solver will be alerted to the number of attempts remaining in the clue box before the search engine takes over. Again, the user may opt to search before making any attempt to insert an answer or letters in a row. A verification tool, operable on a computer typically as resident software or alternatively resident on the network, verifies the selections of characters inserted into the squares and cells of the grid, and the tool verifies the correct selection of the user-selected letters and answers, as well as the incorrect selection of characters input to a cell. The verification tool may be embodied as a look-up table and counter, or may be embodied as a logic circuit that counts incorrect matches inserted by the user and that initiates a search based on the pre-designed clue. The search for dues function is automatically triggered upon a predetermined number of incorrect characters being inserted by the user, or when selected by the user. If a puzzle solver is not able to find an answer on a search page, the puzzle solver can go back and attempt the answer till they are referred to a default search. The number of attempts to answer a due will be restored each time a default or manual search is performed for a clue. The other option for the puzzle solver is to select the option of unlimited attempts wherein, there is no default search performed. These options are shown in the embodiments in FIGS. 2 and 3.

Figure 1:
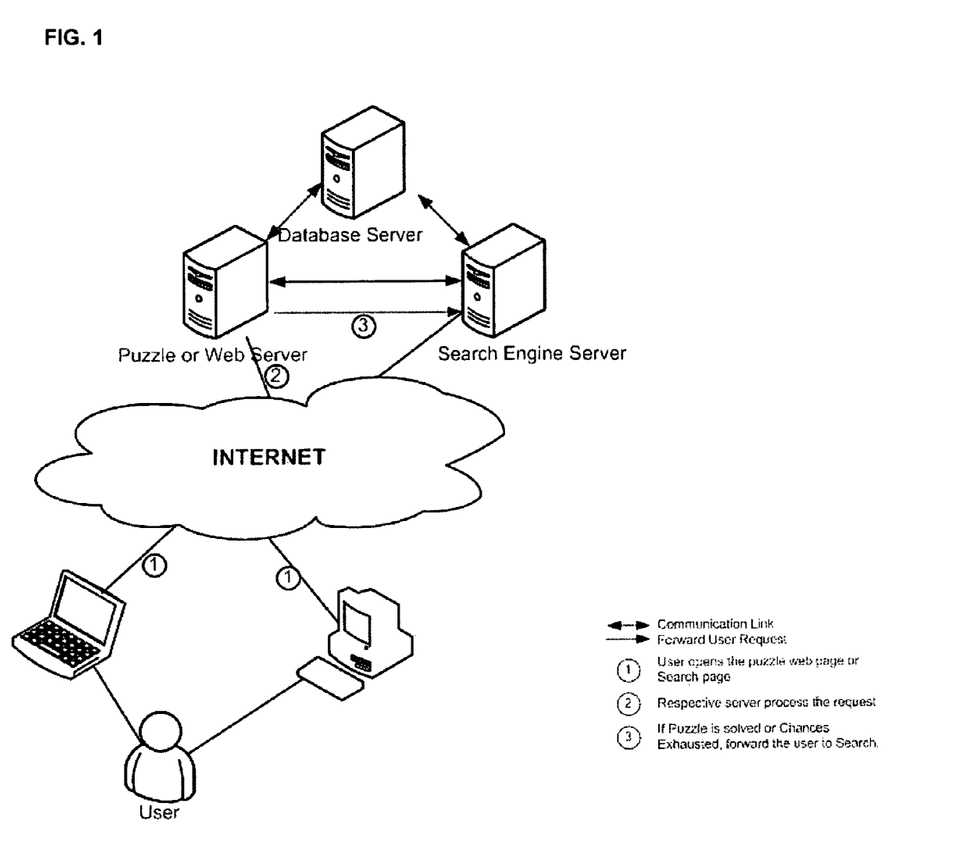
FIG. 1 is a display of Search Engine Crossword Process overview, including (1) User opens the puzzle web page or Search page, (2) Respective server process the request, (2) If Puzzle is Solved or Chances Exhausted, forward the user to Search.

The search results, retrieved by the pre-designed clue being inserted as a query to the search engine, will be data searched via said computer network, which retrieved search results and data will be suggestive of the correct character sets to insert in the row of the grid corresponding to the clue, or to insert and replace the user's incorrect selections. One embodiment of the networked computer useful with the inventive combination and method is depicted in FIG. 1. FIG. 1(1) depicts user opening the puzzle FIG. 1(2) depicts server processing the request from user and FIG. 1(3) depicts user being forwarded to search if puzzle is solved or chances to solve are exhausted.

Step-Wise Description

Step 1: Puzzle solver will open a page, typically on the World Wide Web, and there displayed is a Search Engine Crossword Puzzle.

Step 2: Puzzle solver will decide whether to choose from "unlimited attempts" version and "limited attempts" version.

Step 3: Puzzle solver will read the clues and move the cursor to the appropriate square and type letters of an answer for the clue they decide to solve.

Step 4: If the puzzle solver does not know the answer to a clue, they will have a plurality of options. They may:
A. Guess the answer by typing possible letters or
B. Opt to get a hint or
C. Opt to switch the clue or
D. Move on to a new clue or
E. Perform search for the clue by clicking on the "search" button.
F. Solve a word or the entire puzzle by clicking the respective button If the puzzle solvers decide to guess and type possible letters of an answer, they will receive a limited number of attempts if that is the option they have selected. (as opposed to selecting a version (manual) that gives unlimited attempts). If they fail to guess the correct answer within the given number of attempts, the search engine will perform a search for the clue by default. The Search Engine Crossword will alert the puzzle solvers with the "remaining number of attempts" each time they guess a letter wrong. Thus each clue has a limited number of attempts. A puzzle solver may attempt to solve any number of clues on the Search Engine Crossword puzzle. The Search Engine Crossword puzzle will record and highlight the number of "attempts remaining" for each clue. The number of attempts is reset when a search, manual or default, is performed.

The other option is manual, that is, the Search Engine Crossword puzzle is presented to the user with unlimited attempts to solve the puzzle.

A puzzle solver may work to finish solving the Search Engine Crossword by following any of the steps (A through D) mentioned above. When a manual or default search is performed for a clue, the Search Engine Crossword puzzle solvers go through the following steps: [0044](a). Perform search for a clue [0045](b). Browse through the results page [0046](c). Locate the answer on the results page [0047](d). Type the answer in the Search Engine Crossword (answer turns to hyperlink)

If a puzzle solver is unable to locate an answer on a results page, he may choose to go back and guess the letters to an answer as now their attempts are reset.

By default, all correct answers in the Search Engine Crossword squares will become a hyperlink. Clicking on a hyperlink will also take the puzzle solvers to the results page just as it would when they click on the clue and pick "search," instead of "solve," option. With each option, the invention would display the search results proximate to the crossword puzzle grid. The puzzle solvers who have completed the puzzle will have the option to see how the results for a particular answer were displayed on the results page.

Method of Connecting the Clues and Search Engine.

On the raise of an event, such as placing the cursor on a clue, a pre-defined text (clue) will be passed on to the search engine in a plurality of methods such as parameter or query string for performing the search. The search engine results are configured to appear as part of the parent page or as a separate page in a web browser. This configuration is created using a plurality of programming languages.

Method of Generating Text Clues and Answers.

The designer of the crossword game will generate clues as follows:

A Search Engine Crossword designer would pick a general or specific theme. Accordingly, a crossword puzzle would be designed for a general or niche site with a particular focus (food, wine, etc.). A clue is a hint that aides a crossword puzzle solver to determine the correct word or phrase that fit a row or column of squares on the crossword grid. A clue may appear as plurality of words, phrases, sentences, numbers or images, as in FIG. 5. The clues are carefully picked by the clue designers to match with answers that appear in the results page of a search engine in a plurality of ways. For example, "vehicle" is a due for "car." The due designer may ensure that the answer ("car") appears somewhere on the results page when a puzzle solver searches for the clue "vehicle," FIG. 6. The designer could search each due and ensure that the answer indeed appears on the search engine's results page. Puzzle solvers guess answers based on the clues provided by the Search Engine Crossword designer, and using a text input device, such as a QWERTY keyboard, the user would type in characters that form the word suggested by the pre-designed clue for that cell and row on the puzzle. An answer is a response to a clue. Puzzle solvers are expected to guess correct answers which are predetermined by the designer. The answers may appear as plurality of words, phrases, numbers or images on the first, second or any page of the returned results which a designer chooses for a particular clue or in a unique or conspicuous location of the results page for a particular clue, as in FIG. 6.

The clue designer may also design a plurality of clues for a particular answer in order to mask the search word. For example, for a clue, "unique sauce," the search engine may search for "barbecue." However, the puzzle solver may or may not be able to see the searched word "barbecue." Or, the clue designer may also design clues in which a search engine may search for exactly the same clue. For example, if the clue is "venison," the search engine will search for "venison."

Method of Generating Image Clues and Answers.

As mentioned in the earlier section, the Search Engine Crossword will contain image clues. These clues are generated based on the uniqueness of the images that appear in the results page of a search engine. An image clue could be a 1) combination of an image and text clue or, 2) just an image.

When a clue is a combination of image and text, the clue is presented as an image with a caption. For example an image of a "cat" will have a caption "this animal purrs." The caption may appear on the image or somewhere dose to it as in FIG. 5.

The puzzle solver will see an image clue and follows the same steps as described in earlier section in solving the puzzle.

Method of Generating the Solutions by the User.

A Search Engine Crossword puzzle solver has access to the results with a click of a button. If they choose to view a hint, switch to an alternate clue, get results for a word or the entire puzzle, they may click on a button which takes them to the results section on a separate page or the parent page or a dialog box on the parent page. The results for all clues will be displayed in the crossword grid. All "ACROSS" and "DOWN" answers are hyperlinked to allow puzzle solvers to click on answers and see how results are displayed. By clicking on a hyperlinked answer, puzzle solvers will be taken to the search results page of a clue to demonstrate to the viewer where and how the answers were displayed. The answers may be displayed in a plurality of ways: plain text, highlighted, italicized, or in any other unique form that makes the answers stand out on the search engine's results pages.

Figure 7:
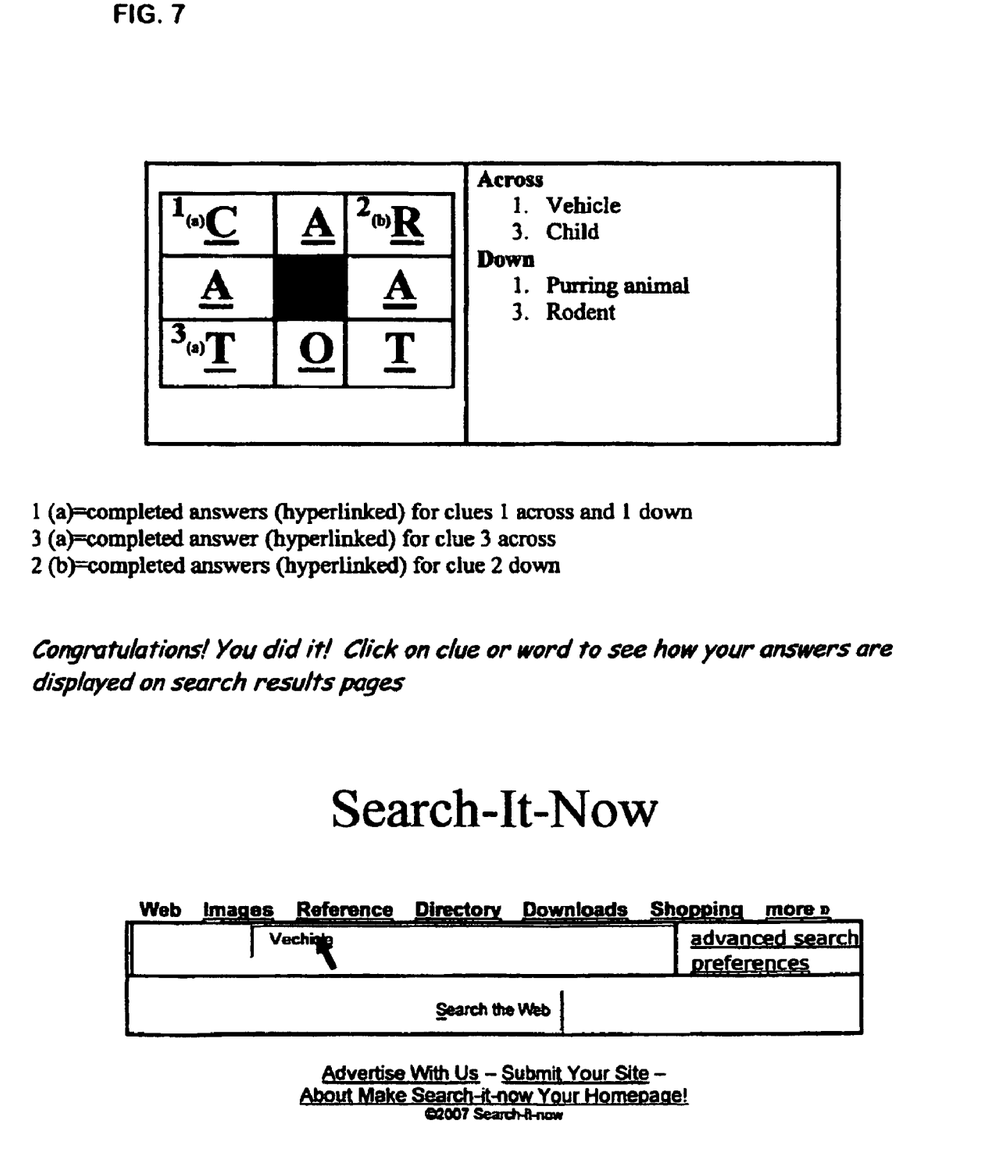
FIG. 7 is a display of completed Search Engine Crossword puzzle in which the answers are hyperlinked, including 2(b) completed answers (hyperlinked) for clue 2 down.

This process is repeated for all clues. Completed answers can be displayed as hyperlinks. So if a filled answer in a row is "road" then the word "road" is hyperlinked all the way across, as in FIG. 7. Likewise, if a filled answer in a column is "street" then the word "street" is hyperlinked all the way down. A hyperlinked answer allows puzzle solvers the option to see how the answers are displayed on the results page of a search engine for a particular clue. For example, if a puzzle solver wishes to see how the answer "road" (clue=pathway) was displayed on the results page, they will simply click on the word "road." Once the solution to the Search Engine Crossword puzzle is given, the puzzle solver will have the option to choose another of the same or different type of puzzle or follow the hyperlinks or quit.

The Search Engine Crossword may appear online, or in an offline print, or electronic publication (newspapers, magazines, TV or radio).

In an offline version of the game, all clues for all the answers will be printed under "across" and "down" sections, just as in traditional crossword puzzles. An offline puzzle solver of Search Engine Crossword may not need access to a computer to complete the puzzle, unless they wish to use an online search engine to find a correct answer to a clue. If offline puzzle solvers choose to know the answer to a particular clue, they have to go to the location of that particular crossword on a website in order to play. Once they are at the online location of the Search Engine Crossword, they will follow the steps described above in filling answers or looking them up on a search engine.

I claim as my invention:

1. A graphical grid interface for inserted and retrieved character sets, operating on a computer networked to the Internet, comprising:
   a grid of cells for insertion of characters, and said cells arrayed in rows horizontally and vertically,
   a cursor computer-generated for navigating among said cells for insertion of user-selected characters,
   a text input device to insert characters into selected cells of said grid of cells,
   a plurality of pre-designed clues, resident in a memory device, each clue corresponding to an array of cells, which clues are suggestive of character sets for insertion in the corresponding cells, wherein each of said plurality of pre-designed clues is pre-designed to retrieve data searched via an Internet search engine that is suggestive of a correct selection of character sets for the row of cells corresponding to said pre-designed clue,
   a verification tool, operating on a computer, which verifies the selections of characters inserted into a row of cells, and which verifies the correct and the incorrect selection of characters inserted to a cell, and a search prompt linked to said pre-designed clues triggered by a cursor roll-over, and a search display box for retrieved data suggestive of said correct selection of character sets.

2. The graphical grid interface of claim 1, wherein said grid of cells for insertion of characters is a crossword puzzle, and said verification tool further comprising:
an enumerator to count user insertion of incorrect characters into selected cells, said enumerator automatically triggering a search request when said enumerator counts a predetermined number of incorrect insertions of characters into selected cells, and prompting said search via said Internet search engine for data suggestive of the correct character sets for insertion to replace said incorrect insertions of characters.

3. The graphical grid interface of claim 1, wherein said cursor is navigated using a computer mouse, and further comprising:
a cursor-initiated display of a plurality of options, initiated when said cursor is placed over a pre-designed clue, with a first option to search for data suggestive of the correct set of characters for insertion, a second option of displaying a hint suggestive of the correct set of characters for insertion, a third option of displaying a new pre-designed clue, and a fourth option of displaying the correct set of characters for insertion.

4. The graphical grid interface of claim 1, wherein each said pre-designed clue has a pre-designed degree of difficulty dependent on the numerosity of suggested data that each said pre-designed clue will retrieve in said search display box.

5. The graphical grid interface of claim 1, further comprising the operative steps of:
generating a graphical grid with user-selectable cells and an interface for insertion of text characters,
signaling intersection between said cursor and a user-selectable cell, and accessing from memory a pre-designed clue and displaying said clue suggestive of character set that spells a word suggested by said clue,
accepting text input to said user-selectable cell,
determining if a character inserted by user in selected cell matches the character set for the word suggested by said clue,
triggering said verification tool if said character inserted in selected cell by user matches, and hyperlinking said character when it matches the correct answer for said user-selectable cell,
triggering said verification tool if said character inserted by user does not match the character set for the selected cell,
registering the number of times that said user inserts a character in a selected cell that does not match the character set for the selected cell,
verifying that said predetermined number of incorrect characters have been inserted by user in a selected cell, and upon verification, copying said pre-designed clue corresponding to said selected cell to a search query box, and prompting a search based on the query that retrieves search results suggestive of the word that matches the character set for the selected cell, and
displaying in said search display box said search results retrieved by said Internet search engine.

6. The combination of claim 1, wherein some of said plurality of said pre-designed clues are images displayed in said search display box.

7. The graphical grid interface of claim 1, wherein said enumerator resets to zero after said search request.

8. The graphical grid interface of claim 2, wherein said enumerator is a logic circuit that counts each time the user inputs characters into a row of cells on said grid, and that when triggered copies the pre-designed clue for said row of cells to said search prompt that opens said search display box and displays said clue and said retrieved data suggestive of said character sets for insertion.

9. The graphical grid interface of claim 5, further comprising hyperlinking said pre-designed clues to a search request generator.

10. The operative steps for completing a grid game with pre-designed word clues operating on a computer networked to an Internet search engine and having a cursor, comprising:
generating a graphical grid with user-selectable cells and an interface for receiving user-inserted characters,
signaling intersection between a user-navigated cursor and a user-selected cell on said grid, and accessing from memory a pre-designed clue and displaying said clue pre-determined to be suggestive of the character set that spells the word suggested by said clue,
accepting text input to said user-selectable cell, displaying a plurality of options, initiated when said cursor is place over a clue, with a first option to search for data suggestive of the correct answer, a second option of a hint suggestive of the correct answer, a third option of a new pre-designed clue, and a fourth option to display the correct answer,
determining when a character inserted by user in the selected cell matches the character set for the word suggested by said clue,
triggering a verification tool when said character inserted in selected cell by user matches,
triggering said verification tool when said character inserted by user does not match the character set for the selected cell,
enumerating the number of times that said user inserts in a selected cell a character that does not match the character set for the selected cell,
verifying that a predetermined number of incorrect characters have been inserted by user in a selected cell, and upon verification, copying said clue corresponding to said selected cell to a search query box, and initiating a search via an Internet search engine, said search based on the pre-determined clue to retrieve search results suggestive of the word that matches the character set for the selected cell, and
displaying said search results in a search display box proximate to said graphical grid.

11. The operative steps of claim 10, and further comprising hyperlinking said character set when it matches the word suggested by said clue.

12. A graphical grid interface for inserted and retrieved character sets, operating on an Internet, comprising:
a grid of cells for insertion of user-selected characters, and said cells arrayed in rows horizontally and vertically,
a cursor computer-generated for navigating among said cells for insertion of said user-selected characters,
a text input device, to insert characters into selected cells of said grid,
a displayable character generator, to display said inserted and retrieved characters,
a plurality of pre-designed clues in resident memory accessed via a processor connected to the Internet, each clue corresponding to an array of cells,
a verification tool, operating on a computer, which verifies the selections of characters inserted into said grid of cells, and which verifies the correct selection of said user-selected characters, and the incorrect selection of characters input to a cell, including an enumerator to count insertion of incorrect characters into selected cells, an automatically triggered search request generator, triggered when enumerator counts predetermined number of incorrect insertions of characters into selected cells, and prompted to retrieve data searched via an Internet search engine suggestive of the correct answer, a cursor-activated display for said pre-designed clues, activated when said cursor is placed over a selected cell, and a cursor-initiated display of a plurality of options, initiated when said cursor is place over a clue, with a first option to search for data suggestive of the correct answer, a second option of a hint suggestive of said correct answer, a third option of a new pre-designed clue, and a fourth option to display said correct answer.

13. The graphical grid interface for inserted and retrieved character sets, operable on the Internet, of claim 12, further comprising:

a search display box for retrieved data suggestive of said character sets for insertion in said corresponding cells.

14. The graphical grid interface of claim 12, wherein the text input device to insert characters is an Internet-enabled mobile phone.

15. The graphical grid interface for inserted and retrieved character sets, operable on the Internet, of claim 13, wherein said pre-designed clue has a pre-designed degree of difficulty dependent on the location of the answer in said search display box for retrieved data.

16. The graphical grid interface for inserted and retrieved character sets, operable on the Internet, of claim 13, wherein said pre-designed clue has a pre-designed degree of difficulty dependent on the numerosity of the answers in the retrieved search data displayed in said search display box.

17. The graphical grid interface for inserted and retrieved character sets, operable on the Internet, of claim 13, wherein said pre-designed clue has a pre-designed degree of difficulty dependent on the correct answer being displayed in highlighted text in said search display box for retrieved data.

* * * * *